United States Patent
Turina et al.

(10) Patent No.: US 7,328,010 B2
(45) Date of Patent: Feb. 5, 2008

(54) METHOD AND APPARATUS FOR STEERING IDLE MOBILE STATIONS

(75) Inventors: Dalibor Turina, Täby (SE); Ulrik Wahlberg, Täby (SE)

(73) Assignee: Telefonaktiebolaget LM Ericsson (pub), Stockholm (SE)

( * ) Notice: Subject to any disclaimer, the term of this patent is extended or adjusted under 35 U.S.C. 154(b) by 147 days.

(21) Appl. No.: 11/010,564

(22) Filed: Dec. 14, 2004

(65) Prior Publication Data

US 2006/0128392 A1    Jun. 15, 2006

(51) Int. Cl.
*H04Q 7/20* (2006.01)

(52) U.S. Cl. .............. 455/426.1; 370/432.1; 370/452.1; 370/453; 370/552.1

(58) Field of Classification Search .......... 455/426.1, 455/432.1, 435.1, 435.2, 435.3, 432.3, 448, 455/453, 454, 552.1, 553.1
See application file for complete search history.

(56) References Cited

U.S. PATENT DOCUMENTS

| | | | |
|---|---|---|---|
| 5,673,307 A * | 9/1997 | Holland et al. | 455/436 |
| 5,781,861 A * | 7/1998 | Kang et al. | 455/442 |
| 5,946,612 A | 8/1999 | Johansson | |
| 6,167,283 A * | 12/2000 | Korpela et al. | 455/525 |
| 6,334,052 B1 | 12/2001 | Nordstrand | |
| 6,456,858 B1 * | 9/2002 | Streter | 455/552.1 |
| 6,560,455 B2 * | 5/2003 | Amin et al. | 455/432.3 |
| 2002/0137518 A1 * | 9/2002 | Achour | 455/447 |
| 2004/0093122 A1 * | 5/2004 | Galibraith | 700/245 |
| 2004/0208126 A1 * | 10/2004 | Wassew et al. | 370/235 |

FOREIGN PATENT DOCUMENTS

| | | |
|---|---|---|
| GB | 2 364 207 | 1/2002 |
| WO | WO 2004/040935 | 5/2004 |
| WO | WO 2004/043104 | 5/2004 |

OTHER PUBLICATIONS

International Search Report and Written Opinion for International Application No. PCT/SE2005/001829 dated May 11, 2006.

* cited by examiner

*Primary Examiner*—Jean Gelin
*Assistant Examiner*—Inder Pal Mehra
(74) *Attorney, Agent, or Firm*—Nixon & Vanderhye P.C.

(57) ABSTRACT

Idle mobile stations are steered to a particular cell or service area to accommodate subscriber preferences or restrictions, subscription services, or network operator preferences or restrictions and/or to accomplish load redistribution or other network management functions. Multiple idle mobile station steering factors are considered. Steering may be accomplished using a variety of techniques such as rejecting registration attempts in certain cells and accepting those attempts in others and adjusting cell broadcast parameters.

20 Claims, 4 Drawing Sheets

METHOD AND APPARATUS FOR STEERING IDLE MOBILE STATIONS

RELATED APPLICATION

This application is related to commonly-assigned, related U.S. patent application Ser. No. 11/010,565, entitled "Method And Apparatus For Steering Idle Mobile Stations," the content of which is incorporated here by reference.

TECHNICAL FIELD

The present invention relates to mobile communications, and more particularly, to steering idle mobile stations to different service areas such as a cell, location area, or routing area belonging to different overlaying radio access technologies (RAT).

BACKGROUND AND SUMMARY

Modern mobile stations, sometimes referred to as mobile terminals or user equipment (UE), are often capable of connecting to and communicating with two or more different types of radio access networks. One example is a dual-mode mobile terminal capable of connecting to a second generation (2G) radio access network, such as the Global System for a Mobile communication (GSM), Digital Advanced Mobile Phone System (D-AMPS), or Pacific Digital Cellular system (PDC), as well as to a third generation (3G) radio access network, such as Universal Mobile Telecommunication System (UMTS), Terrestrial Radio Access Network (UTRAN). Other radio technologies, such as Bluetooth or 802.11, may also be used. An environment that enables access to more than one radio access technology (RAT) is called a multi-access environment.

In general, when the mobile station is "attached" to a network, it can be in either an idle state in which it is not involved in an active connection, e.g. a communication with another subscriber or content server, or in an connected mode in which the mobile terminal is engaged in active connection, e.g., communicating with another subscriber or content server, and receiving service from the network. Although the states of the mobile station may have different labels in different systems, the term "idle" mobile station is used to cover a mobile station in any state in which the mobile station is powered-on but is not actively participating in a communication. During an idle state, the mobile station may select, register with, and "camp on" a cell, belonging to a certain RAT, in order to obtain service when desired by the mobile subscriber or when an incoming call is made to the mobile subscriber. Non-limiting examples of a mobile station being in an idle state where it selects the service area to receive service includes an GSM idle state, a GPRS MM ready state, a GPRS MM stand by state, a CELL_FACH state, a CELL_PCH state, and a URA_PCH state.

In cellular systems, a mobile stations in idle mode autonomously performs a cell-reselection procedure in which the mobile station reads system information (all or only part) broadcast by various cells, including the cell in which the mobile terminal is currently located or registered and neighboring cells, to determine whether to select another cell to camp on. Once a cell re-selection occurs, the network will receive a location update message from the mobile terminal and update the stored location information, (e.g., cell, location area, routing area, etc.), which may be used to page the mobile station.

Ideally, network operators would prefer to have total flexibility in directing or steering mobile subscribers between networks using different radio access technologies provided that the overlaying coverage exists, e.g., to divide the subscribers in different service categories like "gold/silver" subscriptions. This might mean that some mobile stations might camp on a UMTS-based cell while in an idle state as long as there is UMTS coverage. In contrast, mobile stations of subscribers having different subscription are directed to camp on a GSM/GPRS cell. These subscribers camping on GSM may still have the possibility to move to a UMTS cell when requesting certain services.

In order to provide satisfactory service to mobile subscribers and to maximize the capacity of a mobile communications network, it is important to balance the overall network load amongst the various cells within that network. It would be desirable to direct or steer mobile terminals from their respective current cells, if the loads in those current cells exceed a particular threshold, to an overlapping cell with a lower load. Switching active mobile stations with an active connection between cells requires substantial signaling, particularly when the switch is made from a cell in one radio access technology system to another, e.g., WCDMA to GSM. Moving active subscribers also requires that the connection between the mobile terminal and the network be maintained during the entire time that the intersystem change is taking place in order to ensure that the promised quality of service is maintained for that active connection. This consumes considerable resources in both the core and radio networks.

A better solution for satisfying subscriber preferences and network operator preferences, providing subscription services, and accomplishing network management type functions like load redistribution and many others is to dynamically distribute or "steer" in mobile stations to a particular cell or area. Multiple criteria are considered as compared to just considering only one criterion in terms of steering idle mobiles to a first service versus a second service area. In one non-limiting example implementation, the idle mobile stations are steered by adjusting a service area broadcast message parameter based on the multiple steering criteria. An offset may be applied to the broadcast parameter that either tends to steer idle mobile stations towards or away from the service area. For example, an offset parameter may be added to or subtracted from a signal that is measured by the mobile station for a service area selection procedure or a service area re-selection procedure. In order to avoid unnecessary battery drain in idle mobiles, the rate of change at which the broadcast message parameter is changed may be controlled.

Three idle mobile steering considerations are described in a non-limiting example. First, if roaming restrictions for certain service areas or a certain RAT apply to a mobile station, e.g., based on information stored in a mobile subscriber database like a home location register (HLR), the idle mobile station may be steered to an unrestricted service area. Such information might include subscriber information, service utilization history, etc. In one example implementation, roaming restrictions might receive a higher priority than other mobile steering criteria.

Second, knowledge in the network regarding overload conditions in certain service areas or RATs can be used to limit the registrations of incoming mobile stations. By rejecting registration requests to loaded service areas or a loaded RAT supported at a particular service area, mobile stations are re-directed to other less-loaded areas and/or RATs. This method acts as a relatively simple overload protection mechanism.

Third, actual load conditions are considered by the network, and idle mobiles may be steered by the network to balance the loads across multiple service areas or across different RATs. One or more parameters in cell broadcast messages may be adjusted in order to steer the mobile station to camp on a less loaded cell or other service area, or to use a less-loaded RAT. Thus, the cell-reselection procedures, usually driven by the quality of current radio conditions in particular cells, may be affected by adjusting one ore more broadcast parameters to effect a load balancing function.

The service areas may be cells, location areas, routing areas, service areas or the like. The adjustment may be initiated based upon load information from a core network node or from a radio access network node (e.g. from a central radio resource management server). In a preferred, non-limiting example application, a first service area is associated with a first mobile communications network that offers a first set of services, and a second service area is associated with the second mobile communications network that offers a second set of services. Of course, this methodology can be extended to third and additional communications networks, particularly when the subscribed services can be obtained from an additional network.

The first mobile communications network may employ a first radio access technology, and the second mobile communications network may employ a second different radio access technology. For example, the first mobile communications network may be a second generation-based network and the second communications network may be a third generation-based network. The first and second set of services may be different or the same.

DETAILED DESCRIPTION

The following description sets forth specific details, such as particular embodiments, procedures, techniques, etc., for purposes of explanation and not limitation. It will be appreciated by one skilled in the art that other embodiments may be employed apart from these specific details. For example, although the following description is facilitated using non-limiting GSM/GPRS/UMTS examples, radio access technologies other than GSM/GPRS/UMTS may be used. In addition, the described principles may be employed in a communications system that employs only one type of radio access technology or in a communications system that incorporates multiple different radio access technologies.

In some instances, detailed descriptions of well-known methods, interfaces, circuits, and signaling are omitted so as not to obscure the description with unnecessary detail. Moreover, individual blocks are shown in the figures. Those skilled in the art will appreciate that the functions of those blocks may be implemented using individual hardware circuits, using software programs and data in conjunction with a suitably programmed digital microprocessor or general purpose computer, using application specific integrated circuitry (ASIC), and/or using one or more digital signal processors (DSPs).

Figure 1:
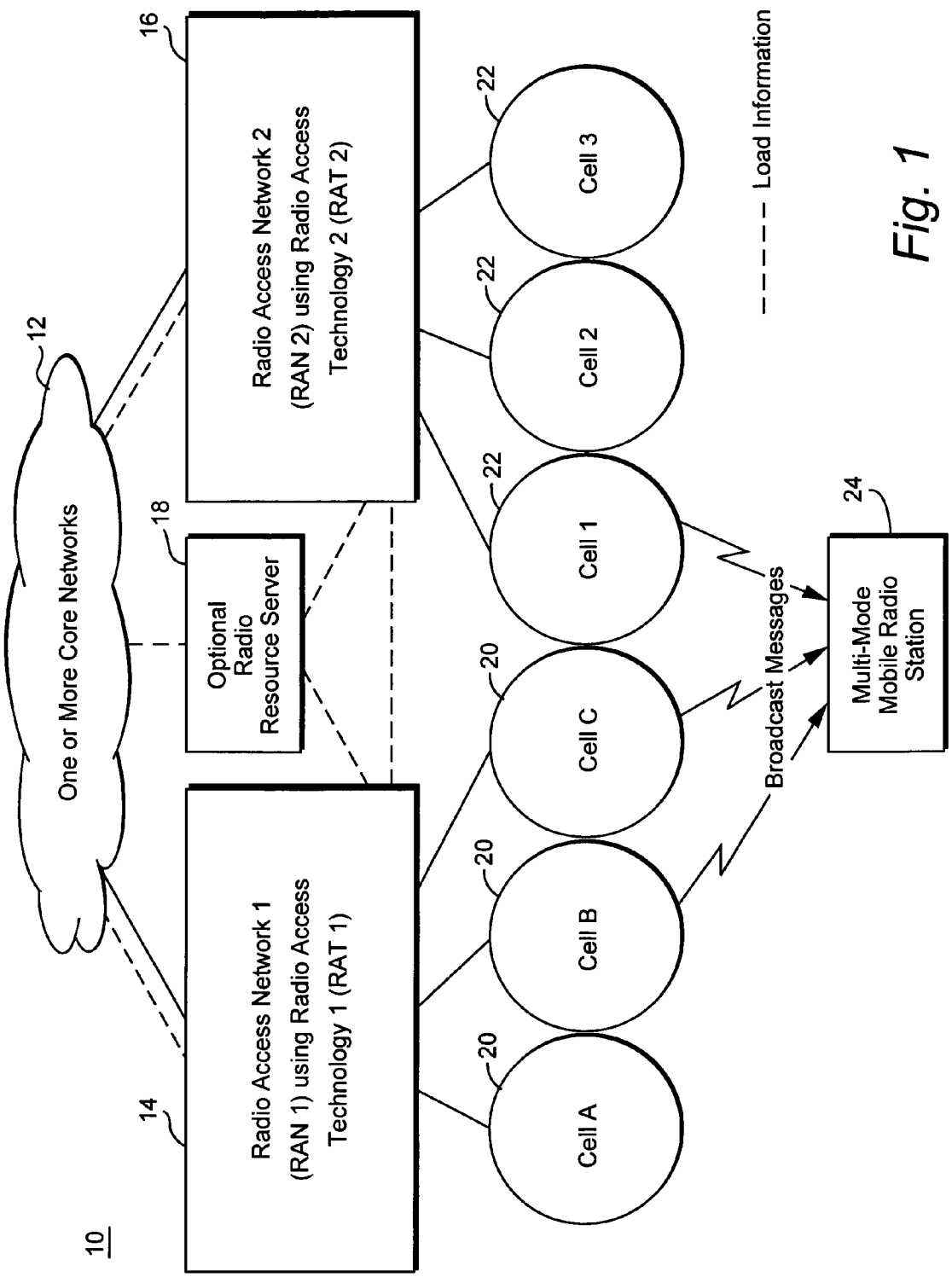
FIG. 1 illustrates a communication system that includes two radio access network using different radio access technologies.

FIG. 1 illustrates a communications system 10 that includes one or more core networks 12 coupled to two radio access networks (RANs) 14 and 16 labeled as RAN 1 and RAN 2. In this example, the radio access network one uses radio access technology 1 (RAT 1), and radio access network 2 uses radio access technology 2 (RAT2). RAT 1 and RAT 2 may correspond to the same or different radio access technologies. RAN 1 supports several cells 20, examples of which are labeled cells A, B, and C. Similarly, radio access network 16 supports several cells 22, examples of which are labeled as cells 1, 2, and 3. Each network may also support location areas which contain multiple cells and routing areas which may contain multiple location areas. Load balancing, mobility management, and other network functions may be improved using idle mobile station steering at the cell level, location area level, routing area level, or any other geographic service/coverage level desired.

Each cell generates a broadcast message. For simplicity purposes, a single multi-mode radio station 24 is shown receiving and detecting broadcast messages from cell B, cell C, and cell 1. The multi-mode radio station 24 can communicate with and receive service from either radio access network, even if their respective radio access technologies differ. The multi-mode radio station or terminal 24 is idle, meaning that it is in a state where it is able to select a cell to register with and camp on. The mobile radio station 24 may initially decide to camp on the cell having the broadcast message with the highest received signal strength. Some other measure of the current radio conditions in the cell may be used.

Information regarding the load level and/or other network factors that might be relevant to idle mobile steering in each cell may be determined by one or more of the following: a node or entity in the core network 12, a node or entity in one or both of the radio access networks 14 and 16, and/or an optional centralized radio resource server 18. That information being communicated between various entities is indicated in FIG. 1 with dashed lines.

Figure 2:
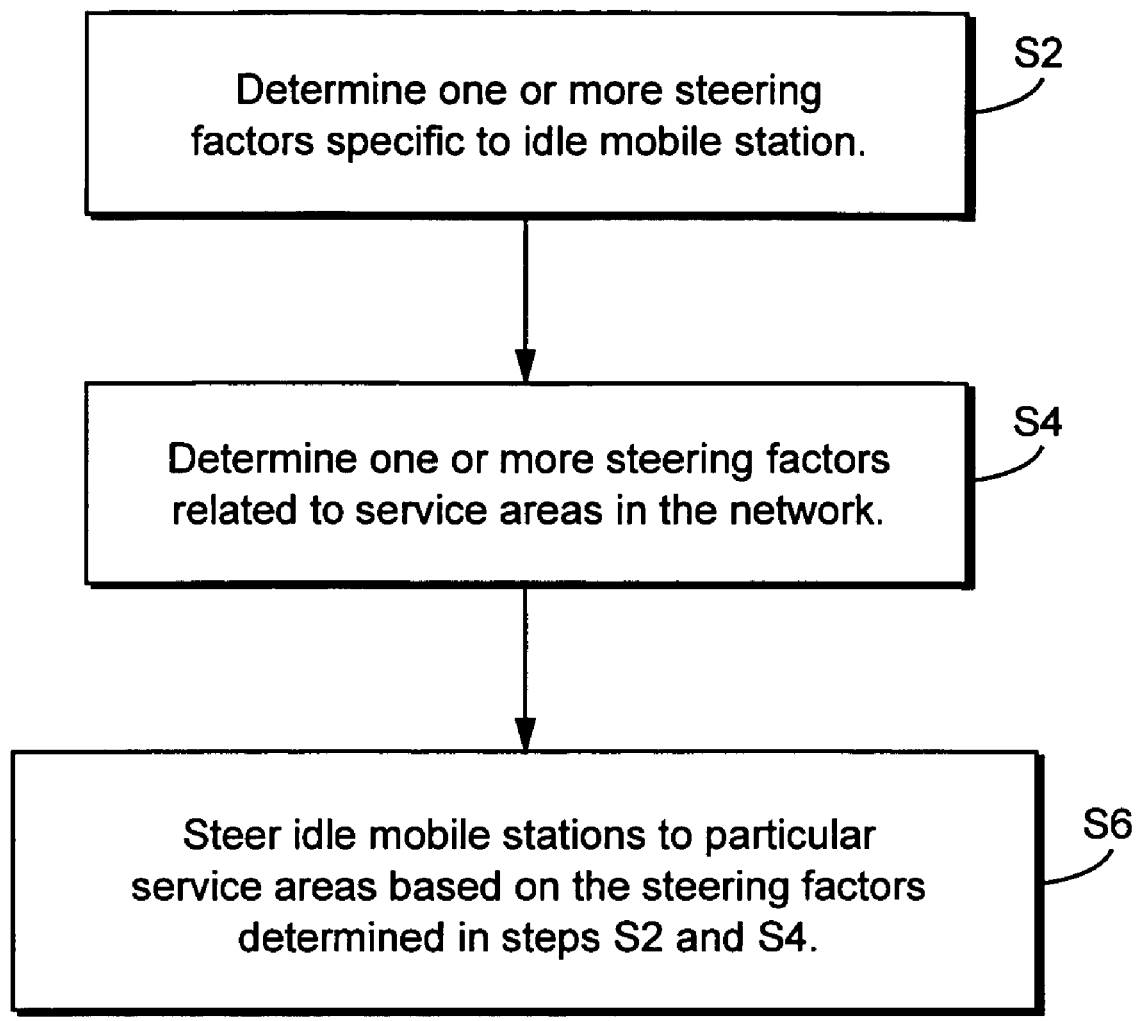
FIG. 2 is a flowchart diagram illustrating example procedures for idle mobile steering.

The flowchart in FIG. 2 outlines general procedures for steering idle mobile stations based on multiple steering factors. One or more steering factors specific to idle mobile stations are determined (step S2). Non-limiting examples of such factors include: subscription information, service utilization history, and mobile terminal capabilities, e.g., capability to use a particular RAT. One or more steering factors related to service areas in the network are determined (step S4). Non-limiting examples of such factors include: RAT service capabilities, RAT/LA/RA/cell load, and operator-determined traffic management policy, (e.g., based on subscribed quality of service (QoS) and/or invoked type of service). The network then steers idle mobile stations to particular service areas based on the multiple steering factors determined in steps S2 and S4 using a broadcast message transmitted by one or more of the service areas. Steering may be accomplished in any suitable fashion. Some non-limiting steering examples are described below.

Two example scenarios can be considered from FIG. 1. It may be desirable in one scenario to maintain the idle mobile station 24 with the same radio access network 14. In that case, it may be appropriate to adjust one or more broadcast message parameters in order to steer the idle mobile terminal 24 from cell C to camp on cell B in RAN 14, both cells B and C belonging to RAN 14. Such a cell re-selection may be particularly seamless if all cells in the radio access network 14 can provide the same service. In any event, this intra-network cell re-selection does not require inter-network cell re-selection messaging. On the other hand, cell B may be too congested or radio access network 14 may not be able to provide a mobile user subscribed service. In that case, adjusting one or more broadcast message parameters to steer the mobile 24 to camp on cell 1, which is associated with the radio access network 16, may be more desirable. The manner in which a broadcast parameter is actually adjusted may be done in any suitable fashion. Of course, other steering techniques may be used.

The idle mobile steering may be implemented or initiated by any suitable node or entity, including for example: one or more core network nodes, one or more radio access network nodes in one or more radio access networks, the central radio resource server 18 (which is optional, depending on the implementation), etc. It may also be desirable to control the frequency or rate of change at which the mobile station may be steered to a new cell in order to avoid unnecessary cell changes and the associated signaling burden. While there may be an exchange of measurements between various entities and nodes, this of course is optional, and any load or broadcast parameter adjustment determinations may be performed within one node or entity. For broadcast parameter adjustments, the actual adjustment will likely be performed in a base station or node B.

Figure 3:
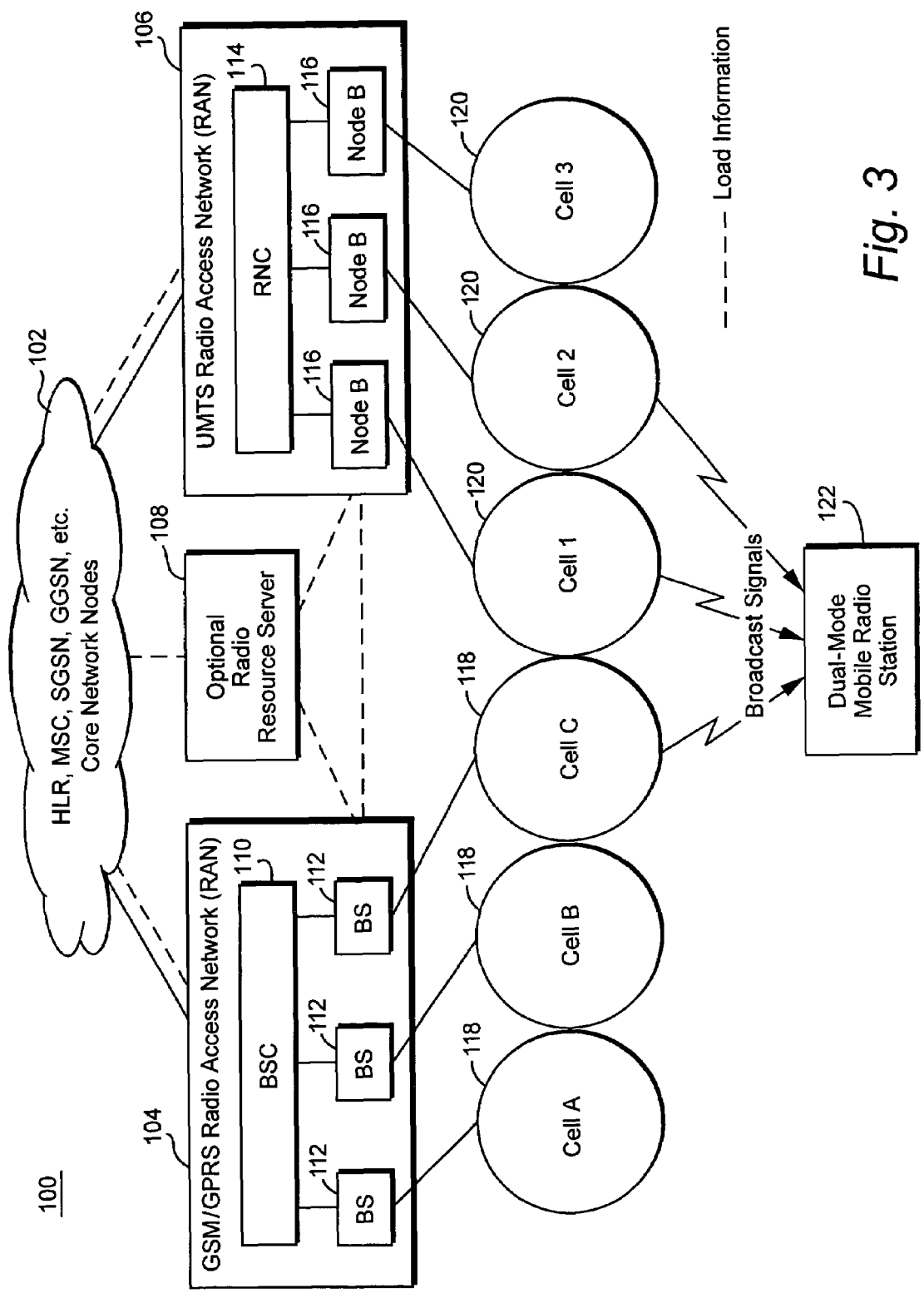
FIG. 3 illustrates another communications system that includes a GSM/GPRS radio access network and a UMTS radio access network.

Reference is now made to another non-limiting, example implementation in the context of communication systems 100 illustrated in FIG. 3. In this system 100, there are two different radio access technologies used in two radio access networks. A GSM/GPRS radio access network 104 employs a TDMA type RAT, and a UMTS radio access network 106 employs a CDMA or WCDMA-based RAT. Both radio access networks are coupled to core network nodes 102 associated with these types of radio access networks including a home location register, HLR, a mobile switching center (MSC), a serving GPRS support node (SGSN), and a gateway GPRS support node (GGSN), etc. The GSM/GPRS RAN 104 includes one or more base station controllers (BSCs), but only one BSC 110 is shown for simplicity. BSC 110 is coupled to one or more base stations (BTSs) 112, and each base station 112 is associated with a particular cell 118. Three example cells are shown: A, B, and C. The UMTS radio access network 106 includes one or more radio network controllers (RNCs), only one RNC 114 is shown for simplicity. Each RNC 114 is coupled to one or more node B's 116. Each node B is associated with one or more cells. For simplicity, each of the three node B's shown is associated with only one cell 1, 2, and 3. Each cell generates a broadcast or reception by mobile terminals. FIG. 3 includes a dual mode radio station 122 that can communicate using the RATs of the GSM/GPRS network 104 and the UMTS radio access network 106.

Multiple idle mobile steering factors are considered, and if desired, prioritized in the idle mobile station service area steering process. In addition, if the mobile terminal can be steered to another cell within the same network, e.g., steer mobile radio station 122 in FIG. 3 from cell 1 to cell 2 which are both in the UMTS radio access network 106, this can avoid inter-network signaling and delays. Idle mobile steering may be accomplished, for example, by rejecting an idle mobile registration or by adjusting one or more broadcast parameters for one or more of the cells, e.g., using an offset. Alternatively, a new set of broadcast parameter values may be calculated. Any steering technique that directs or otherwise causes one or more mobile stations to camp on particular cell, location area (LA), routing area (RA), or other service area (SA), or to use a specific radio access technology (RAT) may be employed.

Figure 4:
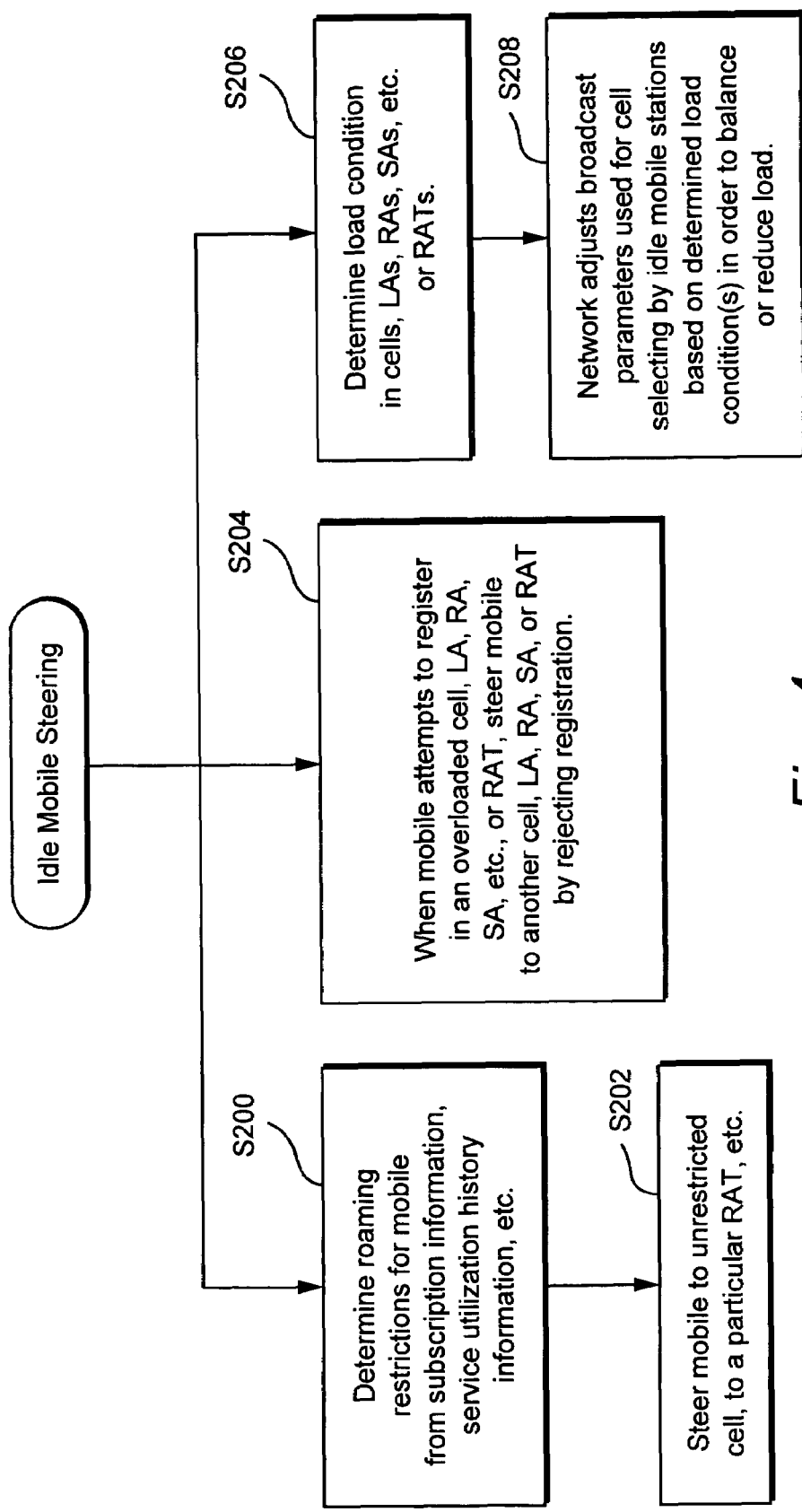
FIG. 4 is a flowchart diagram illustrating more detailed example procedures for idle mobile steering.

The idle mobile station, service area steering process based on multiple steering factors may be employed in any communications system including those illustrated in FIGS. 1 and 3. One implementation in which three example steering considerations are used is now described in conjunction with flowchart labeled "Idle Mobile Steering" shown in FIG. 4. In step S200, roaming restrictions for idle mobile stations are determined. Idle mobile stations are steered away from restricted cells (or other service areas) or RATs to permitted cells (or other service areas) or RATs, for example, by denying the idle mobile terminal registration with restricted cells (step S202). Roaming restrictions may be determined based on a subscription associated with the one idle mobile station. Alternatively, roaming restrictions may be determined based on a history of the one idle mobile station using a particular service. This information and the like may be stored in a subscriber database such as a home location register (HLR). If desired, the roaming restriction steering consideration may be given priority over other steering considerations.

The second idle mobile steering consideration illustrated in step S204 relates to overload situations. Load conditions are monitored in service areas and/or different RATs. When an overload condition is detected, idle mobile stations are denied registration at the overloaded service area, e.g., cell, LA, RA, SA, etc., or to an overloaded RAT.

The third idle mobile steering consideration relates to service area and/or RAT load distribution/balancing. A load condition is determined in cells, location areas, routing areas, service areas, etc. or radio access technologies (step S206). The network adjusts broadcast parameters used for cell selection by idle mobile stations based on the determined load condition(s) in order to balance or reduce load (step S208). Such load distribution may be performed, for example, in accordance with any of the approaches described in the commonly-assigned, related U.S. patent application Ser. No. 11/010,565, entitled "Method And Apparatus For Steering Idle Mobile Stations," incorporated by reference above. Other network functions could be considered as an additional steering factor or instead of load related factors.

In summary, idle mobile stations are dynamically steered to particular service areas and/or RATs, either within the same radio access network technology network or in different radio access technology networks, based on multiple idle mobile steering criteria. This provides a number of benefits: network operator flexibility with respect to traffic management policy, optimized utilization of network resources, reduced overload situations, assurance of satisfactory delivery of subscribed quality of service, subscriber differentiation based on subscribed quality of service (QoS), and minimized need to perform handover of active connections for load balancing purposes.

While the invention has been described in connection with one or more example embodiments, it is to be understood that the invention is not to be limited to any disclosed embodiment, but on the contrary, is intended to cover various modifications and equivalent arrangements included within the scope of the appended claims.

The invention claimed is:

1. A method implemented in a network for distributing idle mobile stations between service areas, where each of the idle mobile stations is in a state where the mobile station selects a service area to receive service based on one or more parameters provided from the network using one or both of a first broadcast signal in a first service area or a second broadcast signal in a second service area, comprising:

determining a first steering factor specifically associated with an individual idle mobile station;

determining a second different steering factor associated with one or both of the first service area and the second service area; and steering the idle mobile station to register with the first service area or the second service area based on the first and second steering factors.

2. The method in claim 1, wherein a third service area offering a same set of services as the first service area is preferred over a fourth service area that does not offer a same set of services as the first service area.

3. The method in claim 1, wherein determining the first steering factor includes determining whether a roaming restriction applies to the idle mobile station for the first service area or the second service area.

4. The method in claim 3, wherein the steering includes denying registration to the idle mobile station in a roaming restricted service area.

5. The method in claim 3, wherein determining the second steering factor includes determining that an overload situation exists in one of the first service area or the second service area.

6. The method in claim 5, wherein the steering includes denying registration to the idle mobile station in an overloaded service area.

7. The method in claim 5, further comprising:

determining a third steering factor related to a load condition in the first service area or a load condition in the second service area, wherein the steering is based on the first, second, and third steering factors.

8. The method in claim 7, wherein if the load condition for the first service area or the second service area needs reducing, instructing adjustment of one or more parameters in one or both of the first and second broadcast messages in order to steer the idle mobile station to register with a service area other than the loaded service area.

9. The method in claim 3, wherein roaming restrictions are determined based on a subscription associated with the idle mobile station or based on a subscription history of the idle mobile station.

10. The method in claim 1, wherein the steering includes steering the idle mobile station to register with a service area using a particular radio access technology.

11. Network apparatus for distributing idle mobile stations between service areas, where each of the idle mobile stations is in a state where the mobile station selects a service area to receive service based on one or more parameters provided by one or both of a first broadcast signal in a first service area or a second broadcast signal in a second service area, comprising:

means for determining a first steering factor specifically associated with an individual idle mobile station;

means for determining a second different steering factor associated with one or both of the first service area and the second service area; and means for steering the idle mobile station to register with the first service area or the second service area based on the first and second steering factors.

12. The apparatus in claim 11, wherein another service area offering a same set of services as the first service area is preferred over another service area that does not offer a same set of services as the first service area.

13. The apparatus in claim 11, wherein the means for determining the first steering factor is configured to determine whether a roaming restriction applies to idle mobile station for the first service area or the second service area.

14. The apparatus in claim 13, wherein the means for steering includes means for denying registration to the idle mobile station in a roaming restricted service area.

15. The apparatus in claim 14, wherein the means for denying registration is configured to determined roaming restrictions based on a subscription associated with the idle mobile station or based on a subscription history of the idle mobile station.

16. The apparatus in claim 13, wherein the means for determining the second steering factor is configured to determine that an overload situation exists in one of the first service area or the second service area.

17. The apparatus in claim 16, wherein the means for steering includes means for denying registration to the idle mobile station in an overloaded service area.

18. The apparatus in claim 11, further comprising:

means for determining a third steering factor related to a load condition in the first service area or the second service area, wherein the means for steering is configured to steer the idle mobile station based on the first, second, and third steering factors.

19. The apparatus in claim 18, wherein if the load condition for the first service area or the second service area needs reducing, the means for steering includes means for instructing adjustment of one or more parameters in one or both of the first and second broadcast messages in order to steer the idle mobile station to register with a service area other than the loaded service area.

20. The apparatus in claim 11, wherein the means for steering is configured to steer the idle mobile station to register with a service area using a particular radio access technology.

* * * * *